United States Patent [19]

Wood

[11] 4,109,762

[45] Aug. 29, 1978

[54] BRAKE DEVICE FOR A BICYCLE AND THE LIKE

[76] Inventor: Philip Wood, 17818 W. Vineland Ave., Monte Sereno, Calif. 95030

[21] Appl. No.: 769,778

[22] Filed: Feb. 17, 1977

[51] Int. Cl.$^2$ .............................................. B62L 1/00
[52] U.S. Cl. ..................................... 188/26; 188/72.9
[58] Field of Search ................ 188/18 A, 24, 26, 72.9

[56] References Cited

U.S. PATENT DOCUMENTS

| 2,612,968 | 10/1952 | Hood | 188/26 |
| 3,708,041 | 1/1973 | Hahn | 188/72.9 |
| 3,907,074 | 9/1975 | Rist | 188/72.9 |
| 3,927,736 | 12/1975 | Bergles | 188/26 |

FOREIGN PATENT DOCUMENTS 1,247,219  10/1960  France ..................... 188/72.9

Primary Examiner—Duane A. Reger
Attorney, Agent, or Firm—Gerald L. Moore

[57] ABSTRACT

A brake device which can be mounted on such vehicles as a bicycle and includes a brake disc which is fixed for rotation with the hub between a backing plate and pressure plate stationarily mounted. An actuator is provided for moving the pressure plate toward the backing member to squeeze the brake disc therebetween and impart a braking action on the disc and hub.

8 Claims, 4 Drawing Figures

BRAKE DEVICE FOR A BICYCLE AND THE LIKE

BACKGROUND OF THE INVENTION

The present invention has been developed to provide better braking for vehicles, and primarily is provided for incorporation onto bicycles. With the greater usage of multiple speed bicycles a substitution for the previously used coaster brake within the hub had to be utilized. In addition tandem bicycles are being used more requiring greater braking power. Previously the substitution for the coaster brakes has included caliper type brakes which rub or grip the rim for slowing the wheel. However such brakes do not always provide sufficient braking power and also have other obvious disadvantages such as being affected by wet weather and being noisy. In addition the heat generated in the rim by caliper brakes is conducted directly to the tire. This is particularly dangerous for tandem bicycles because such bicycles are heavy and thereby generate far more heat in stopping than is encountered with solo bicycles.

It is the primary purpose of the subject invention to provide an improved brake device for a wheeled vehicle. In particular a primary aim of this invention is to provide an improved brake device which can be mounted easily onto an existing bicycle or a standard bicycle assembly.

SUMMARY OF THE INVENTION

A brake device for use on wheeled vehicles such as a bicycle which is a complete, self-contained unit and which is mounted adjacent the wheel hub. Within the device is a backing plate and a pressure plate mounted in axially-spaced relationship and fixed against rotation. Driven by the hub is a brake disc positioned between the backing plate and the pressure plate. An actuator mechanism is provided for moving the pressure plate axially toward the backing plate to squeeze the braking disc therebetween for effecting a braking action on the disc and attached hub. The brake disc is mounted on the hub in a manner to allow axial movement so as to seek a neutral position when the brake is not being applied and to allow centering between the backing plate and the pressure plate when the brake is being applied.

DESCRIPTION OF THE INVENTION

Figure 1:
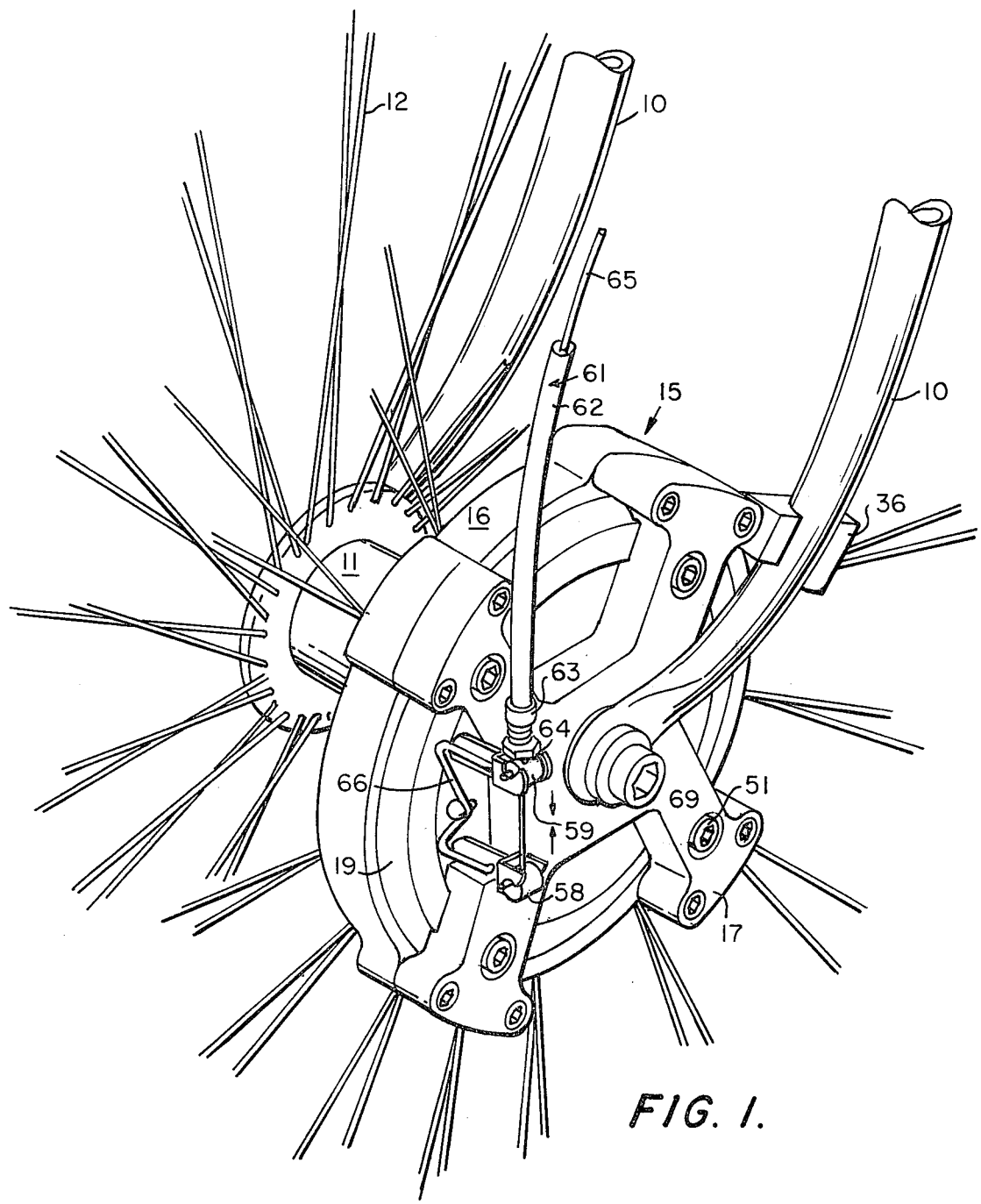
FIG. 1 is a perspective view of the brake device mounted at the front wheel hub of a bicycle.

In FIG. 1 is shown one typical application for the subject invention. Shown is a portion of a bicycle including the front wheel mounted on a pair of front fork members 10. The wheel portion shown includes a hub 11 for supporting a plurality of spokes 12 on which can be mounted a rim and tire (not shown).

The overall purpose of the present invention is to provide a compact and effective brake device for such vehicles as the bicycle shown. The brake device provided is constructed as a compact unit which can be mounted with little modification to a standard bicycle at either the front or rear axle. Actuation of the brake preferably is by a lever located on the handlebar.

In accordance with the present invention, there is provided a self-contained brake device 15 adapted for mounting on and concentric with the hub of a bicycle. The device comprises a backing plate 16 to which is fastened a front bracket 17. Sandwiched between the backing plate and the front bracket is a brake disc 18 and a pressure plate 19. An actuator mechanism 20 serves to move the pressure plate 19 axially to squeeze the brake disc 18 between the backing plate surface 16A and the pressure plate surface 19A to effect the braking action.

Figure 3:
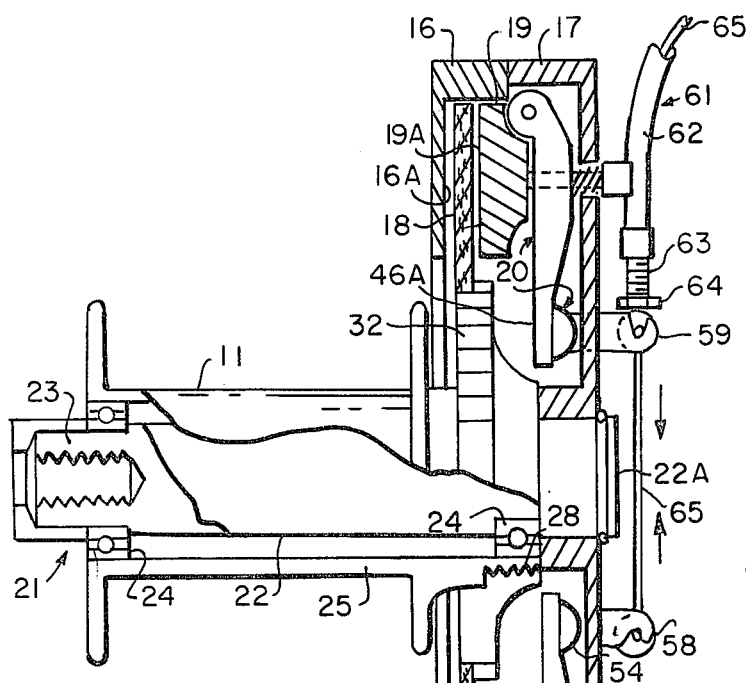
FIG. 3 is a cross-sectional view of the brake device.

To adapt the front hub 11 for the mounting of the brake device 15, the hub as shown in FIG. 3 must include a suitable axle assembly 21. This axle assembly comprises an axle shaft 22 with threaded openings 23 at each end for fastening to the bicycle. The end 22A of the axle is suitably shaped to provide a firm mounting for the front bracket 17 of the brake. The axle also supports two bearings 24 on which in turn is rotatably mounted the hub housing 25. The hub housing also includes a means for securely fastening a splined driver 26. This is shown as a threaded surface 27 on the hub housing mating with threaded surface 28 of the driver. This is a suitable fastening method for a bicycle service because it is a unidirectional vehicle not requiring reverse braking. If the brake device is to be mounted on a rear hub (not shown) room is provided for a drive sprocket at the end of the hub opposite the brake device.

For mounting the brake device onto the bicycle hub, the backing plate 16 includes a center opening 30 sufficiently large to pass over the splined driver thus facilitating assembly of the brake device onto the hub. The brake disc 18 includes a splined center opening 31 sized to interfit with the splined teeth 32 of the driver 26 such that the members rotate together. The bracket 17 includes a center opening 33 sized to permit close passage therethrough of the extending end 22A of the axle. Thus the primary support for the brake device on the hub assembly is provided by the bracket 17 fitting over the axle. To hold the brake device onto the axle an O-ring 34 is fitted into an O-ring seat 35 on the shaft end 22A.

To prevent relative motion between the brake device and the bicycle an anchor 36 is provided which is held on the backing plate by the screws 37 passing through holes in the anchor and threaded into the holes 38 in the backing plate. This anchor includes a concave portion 36A which fits around the front fork 10 as shown in FIG. 1. Similarly a brake on the rear of a bicycle would have an anchor cooperating with an adjacent frame member for the purpose of resisting the braking torque reaction. To hold the brake device together, bolts 40 are passed through the openings 41 in the bracket 17 and are threaded into the openings 42 in the backing plate. The backing plate includes flanges 43 to accommodate the threaded openings. In addition to prevent relative rotation while permitting axial movement of the pressure plate 19 relative to the backing plate 16, the pressure plate includes extending projections 44 sized to slide within the axially extending recesses 45 in the backing plate. Thus axial movement of the pressure plate is permitted while rotation thereof is prevented.

For actuation of the brake, axial movement of the pressure plate 19 towards the backing plate 16 is effected to squeeze the brake disc 18 therebetween. The brake disc 18 is made of a brake material of the usual type and the surfaces 16A and 19A on the backing plate and pressure plate facing the disc are of wear-resistant material to lessen deterioration of the brake device when the brake is used.

For actuation of the pressure plate to effect the braking action there are provided four levers 46, one located in each extending leg 17A of the bracket 17 and each positioned within a groove 47 facing the pressure plate. Each of the levers 47 is held in place by a pin 48 fitting into a cooperating recess 49 in the bracket 17. Threaded into an opening 50 in each of the levers is a brake clearance adjustment screw 51. The head of the adjustment screw passes through an aligned opening in the bracket 17 so as to be accessible from outside the brake device housing. The inner end 51A abuts a hardened contact area 52 on the pressure plate. By movement of the extending end 46A of the lever 46 towards the pressure plate 19, the screw 51 is caused to contact the pressure plate to move it in the direction of the brake disc to accomplish the braking action.

Figure 4:
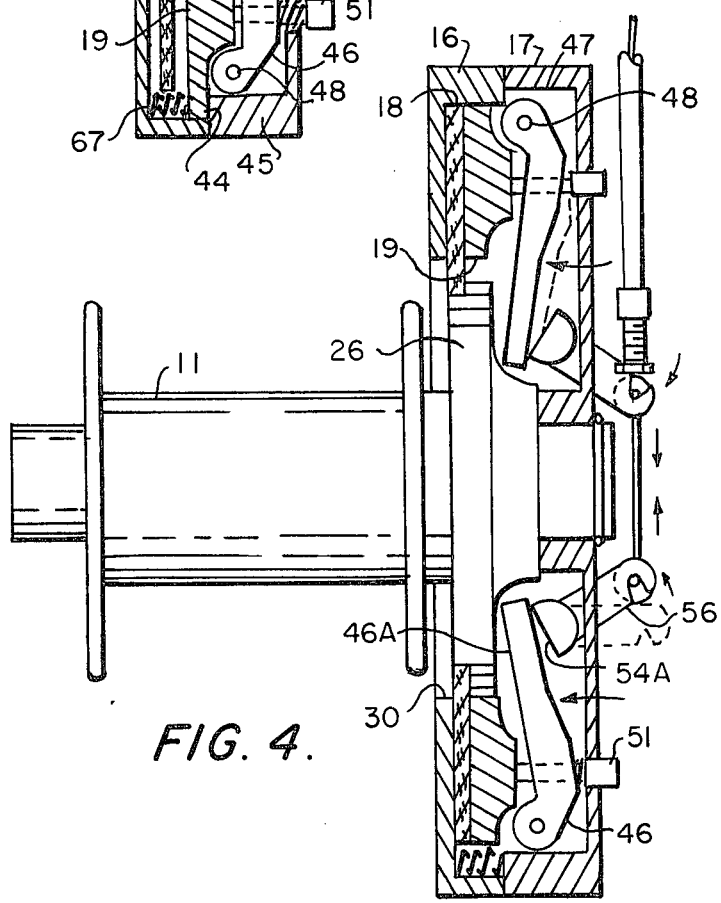
FIG. 4 is a cross-sectional view of the brake device similar to FIG. 3 with the braking action being applied.

For actuation of the lever end 46A towards the pressure plate, there are provided two camshafts 54 in cooperating recesses 55 in the bracket. These camshafts are positioned between the bracket and the extending end 46A of the lever and include a flattened surface 54A which abuts the adjacent surface of the extending end of the lever. Thus rotation of the camshafts will cause rotation of each lever about the pin 48 such that the end 46A is pushed towards the pressure plate. As shown in FIG. 4 rotation of the camshaft 54 will cause the end 46A of the lever 46 to move toward the pressure plate carrying with it the adjustment screw 51 forcing the extending end 51A thereof into contact with the pressure plate to move the pressure plate axially. Movement of the pressure plate will shift the brake disc 18 axially until it contacts the adjacent surface 16A at which time the brake disc is squeezed between the pressure plate and the backing plate to effect the braking action on the bicycle hub. By freely fitting the brake disc onto the splined driver, axial movement of the brake disc is permitted while relative rotation between the splined driver and the braking disc is prevented.

The splined connection between the splined driver and the braking disc allows the brake disc to seek a neutral position when the brake is not being applied yet allows axial movement of the brake disc with movement of the pressure plate until it contacts the backing plate for application of the brake. It is important that the brake disc be permitted this axial movement not only for application of the brake but also to permit the brake disc to seek the neutral position when the brake isn't applied so as not to drag against either the pressure plate or the backing plate. The brake disc thus will move axially as it momentarily contacts either of these members, such contact causing this axial movement until no further contact is made. Thus not only is drag on the wheel eliminated but also no noise results from the contact of the brake disc with the other brake device members.

For actuation of the camshafts 54 actuating arms 56 are fixed to the end of each of the camshafts that extends out of an opening in the side of the bracket 17. These actuating arms terminate in oppositely facing brackets 57 for receiving a cable wire fitting 58 and a cable housing fitting 59 as shown in FIG. 3. In the standard manner a brake cable 61 is provided which includes the cable housing 62 abutting a cable adjusting screw 63 having a lock nut 64 threaded thereon to enable adjustment of the relative positions of the cable housing and an included cable wire 65. The brake cable extends up to the handle bars (not shown) where it is fixed to a hand lever (not shown) of the usual design. Thus by movement of the hand lever the cable wire 65 can be moved relative to the cable housing 62 to cause relative movement of the actuating arms 56 in the manner shown in FIGS. 3 and 4 for rotation of the camshafts 54 to axially move the pressure plate towards the braking disc. A cable tension spring 66 is provided to maintain the actuating arms in the non-braking or spaced-apart position and to provide positive return of the brake cable and hand lever.

To maintain the pressure plate 19 in the non-braking position shown in FIG. 3, there are provided four return springs 67 positioned between the pressure plate projections 44 and the backing plate and circumferentially spaced outward from the brake disc. These springs fit into recesses 45 in the backing plate. In addition, the brake clearance adjustment screws 51 can be turned to move them axially relative to the levers. Such movement changes the spacing between the lever and the pressure plate to the extent that the stroke of the pressure plate can be adjusted. These adjustment screws can either be of the self-locking type or include retention springs 68 to maintain them in tension within the threaded opening of the lever so that the force from the brake action does not cause them to turn in the actuating levers. Of course actuation of the brake device can be either mechanical as shown, or can be hydraulic or any other suitable means.

Figure 2:
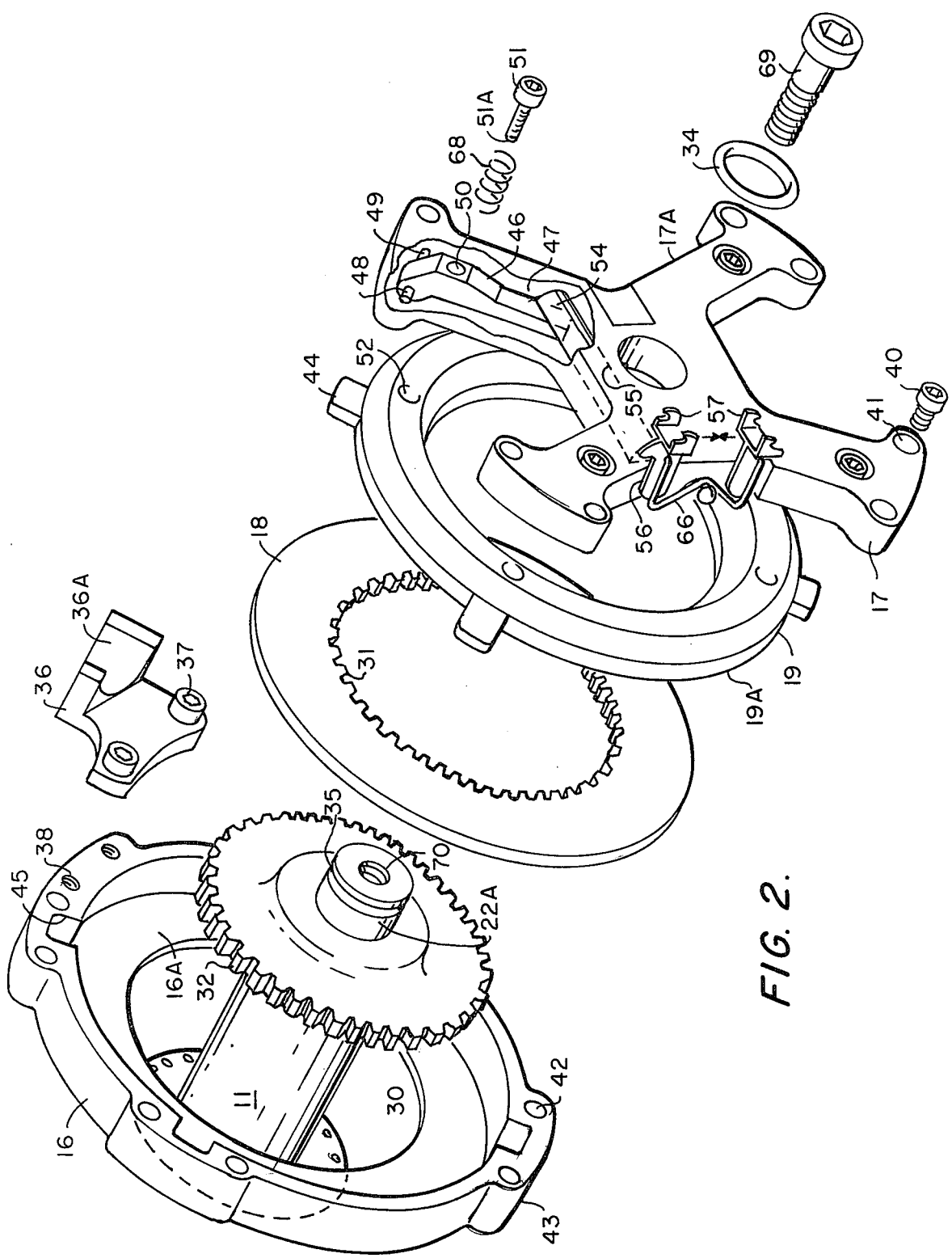
FIG. 2 is an exploded view of the brake device.

As shown in the drawings the brake device is mounted within the frame of the bicycle by inserting a hub bolt 69 (FIG. 1) through an opening in the fork and into a threaded opening 70 (FIG. 2) in the end of the shaft 22. A similar fastening means is provided for the opposite end of the shaft and the other fork.

Thus it can be seen that there is provided a brake device which can be readily adapted for use on a bicycle or similar vehicle to provide the advantages of disc brakes. In addition the brake device is not self-energized and therefore has less tendency to lock up, is relatively insensitive to the environment, i.e., water, etc. and essentially does not fade because additional pressure on the pressure plate can be applied to make up for any change in coefficient of friction which might result from the heating of the rubbing parts. The pressure on the pressure plate is not dependent on coefficient of friction as it is in self-energized brakes. Also heated parts are exposed to the cooling action of the moving air and are sufficiently isolated to prevent any excessive temperature rise in vital parts such as the hub bearings and tires.

The invention claimed is:

1. A brake device for a vehicle having a hub rotatably mounted on the vehicle frame for supporting a wheel, said brake comprising, in combination:
   an annular backing plate having a center opening;
   an annular pressure plate having a center opening and being mounted on said backing plate for movement towards and away from said backing plate;
   means mounting said backing plate and pressure plate concentric to said hub in a position stationary to the vehicle frame;
   an annular brake disc having a center opening and being positioned between said backing plate and said pressure plate;
   means mounting said brake disc concentric to said hub for rotation therewith while permitting movement in the axial direction relative to the hub; and actuating means mounted on the backing plate in contact with said pressure plate for moving the pressure plate and brake disc towards the backing plate to squeeze the brake disc therebetween and effect a braking action on the brake disc and the attached hub which when no braking action is effected, the brake disc will move axially to seek a position out of contact with the backing plate and pressure plate.

2. A brake device as defined in claim 1 wherein said means for attaching the brake disc to the hub includes a splined driver mounted on the hub and a complementary splined surface on the brake disc.

3. A brake device as defined in claim 1 wherein said backing plate, pressure plate and brake disc are positioned concentrically about the hub.

4. A brake device as defined in claim 3 wherein said means for mounting said brake disc on said hub includes a splined driver fixed to the hub and a complementary splined surface on the brake disc.

5. A brake device as defined in claim 4 wherein said actuating means comprises a camshaft;

means connecting said camshaft and said pressure plate; and an actuator for rotating said camshaft to move said pressure plate axially towards said brake disc.

6. A brake for a bicycle having a hub for supporting a wheel and being rotatably mounted on an axle fixed to the bicycle, said brake comprising, in combination:

a circular backing plate;

a circular pressure plate mounted on the backing plate in a manner to allow relative axial movement while preventing relative rotation therewith;

a circular brake disc positioned between the backing plate and the pressure plate and having fixed to the axially facing surfaces a material forming a braking surface;

a bracket fixed to the backing plate in a position to include therebetween the pressure plate and brake disc, with the pressure plate being positioned adjacent said bracket;

means for mounting the bracket on the bicycle including an opening in the bracket for receiving the bicycle axle and locking means for maintaining the bracket on the bicycle axle;

means attaching the brake disc to the hub such that the brake disc rotates with the hub;

means attached to the backing plate and bracket for preventing rotation relative to the bicycle; and actuating means mounted on the bracket operable to force the pressure plate in the axial direction towards the backing plate to squeeze the brake disc therebetween and effect a braking action on the brake disc and hub.

7. A brake for a bicycle as defined in claim 6 wherein said means fixing the brake disc for rotation with the hub permits axial movement of the brake disc relative to the hub.

8. A brake for a bicycle as defined in claim 7 wherein said backing plate, brake disc and pressure plate are mounted concentric to the hub.

* * * * *